Patented June 10, 1941

2,245,458

UNITED STATES PATENT OFFICE 2,245,458

PLASTER MATERIAL

Homer P. Brown, Placerville, Calif.

No Drawing. Application June 12, 1939,
Serial No. 278,725

3 Claims. (Cl. 106—118)

This invention relates to plaster material, and is particularly directed toward a new and useful combination of elements, minerals and chemical compounds aimed to facilitate the hard setting of plaster, irrespective of the speed at which it may dry.

Great difficulty has been experienced in the plastering art in connection with plastering in areas where extreme heat conditions exist. It often happens that the plaster will dry so rapidly that it will not set before it has dried, and consequently it will readily crack and disintegrate. As a result, many unsatisfactory plastering operations are carried out in hot climates with a resulting dissatisfaction on the part of the property owners.

The present invention therefore relates to the introduction into the lime used in the making of plaster of certain ingredients, minerals, chemical compounds or elements which will effect the proper setting of the plaster regardless of the speed at which the same dries. With my improved composition, the setting of the plaster has been found to be entirely satisfactory regardless of the speed at which the plaster dries, the plaster becoming hard immediately upon drying.

My new invention has been developed after many months of experimentation and actual practice has proven its utility. I am, however, unable to state at this time the exact chemical or other phenomenon which occurs due to the introduction of my novel ingredients into the plaster material.

My invention generally comprises the introduction into combination with ordinary lime, commonly used in the making of plaster, of certain percentages of the mineral antigorite, plus a small percentage of sulfur.

Antigorite is one of the minerals occurring in serpentine rock and having the chemical composition $H_4Mg_3Si_2O_9$ or possibly $$2H_2O \cdot 3MgO \cdot 2SiO_2$$

Generally speaking, it is a hydrous magnesium silicate. The type of antigorite with which I have conducted my experiments is derived from a double formation which includes two types of rock appearing in strata. Each stratum consists of mineral having what I believe to be the same general chemical characteristics, but vary in structural appearance; that is, one is a hard dark colored material estimated to be about 40% of the deposit, and the other a softer and more fibrous, lighter colored rock estimated to be about 60% of the deposit. It is believed, however, that these different strata of the mineral differ only in color and texture, and do not radically differ in chemical analysis.

I have found from my experiments that I can use the quarry run of this mineral indiscriminately, or can use equal parts of the minerals having the different color and texture, or can use 40% of the hard dark-colored rock and 60% of the softer and more fibrous material, and obtain comparable results in the final material. However, I have determined that in the preferred form of my invention I should mix ordinary lime, finely comminuted mineral antigorite and sulfur in the following preferred proportions, by weight: Lime 65%; mineral antigorite 35%, and to this total composition I then add approximately 2% by weight of sulfur. While 2% of sulfur is preferred, this may range from 1% to 5% with fairly satisfactory results.

These ingredients are then all intimately intermixed, and result in a final product which constitutes my new plaster material. This material when then mixed with water in the desired proportions, provides a plaster which may be used successfully regardless of the climatic conditions, since even though the plaster dries out very quickly, the same takes its set in a proper and effective manner, with a resulting hard set-up wall.

For the purpose of illustration I have given certain percentages of material to be used. I do not believe these percentages to be critical, provided the added materials do not exceed the amount of lime. Some desired reaction has been noted where mineral antigorite has been added from small percentages up to 50% of the whole and therefore the percentages may be varied through a considerable range with fairly satisfactory results, although I have found that the percentages given above are preferable in gaining the most satisfactory results. I am able to give little or nothing as to the real constitution of the product resulting from my admixture of the stated ingredients nor am I able to understand and explain the resulting phenomenon produced by this new composition in providing the proper setting of the plaster irrespective of the speed of drying.

I claim:

1. A plaster material obtained by mixing with lime a finely comminuted mineral antigorite and sulfur.

2. A plaster material obtained by mixing with lime a finely comminuted mineral antigorite in the preferred percentages of approximately 65% of lime and 35% of the mineral antigorite by weight.

3. A plaster material obtained by mixing with lime a finely comminuted mineral antigorite in the preferred percentages of approximately 65% of lime and 35% of the mineral antigorite by weight, to the total of which is added approximately 2% of finely comminuted sulfur.

HOMER P. BROWN.